US008024797B2

(12) United States Patent
Kohlenberg et al.

(10) Patent No.: US 8,024,797 B2
(45) Date of Patent: Sep. 20, 2011

(54) METHOD, APPARATUS AND SYSTEM FOR PERFORMING ACCESS CONTROL AND INTRUSION DETECTION ON ENCRYPTED DATA

(75) Inventors: Tobias M. Kohlenberg, Portland, OR (US); Ravi Sahita, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1311 days.

(21) Appl. No.: 11/317,090

(22) Filed: Dec. 21, 2005

(65) Prior Publication Data

US 2007/0180238 A1  Aug. 2, 2007

(51) Int. Cl.
*G06F 11/00* (2006.01)

(52) U.S. Cl. ............. 726/22; 726/23; 726/24; 713/189; 713/193

(58) Field of Classification Search ............. 726/22–25; 713/187–189, 2, 192, 193; 710/22; 709/212, 709/224
See application file for complete search history.

(56) References Cited

U.S. PATENT DOCUMENTS

| 6,393,568 | B1 | 5/2002 | Ranger |
| 6,560,705 | B1 | 5/2003 | Perlman |
| 6,948,060 | B1 | 9/2005 | Ramanathan |
| 7,483,998 | B2 * | 1/2009 | Rabinovitch .................. 709/238 |
| 2001/0042214 | A1 | 11/2001 | Radatti |
| 2002/0129237 | A1 | 9/2002 | Radatti |
| 2003/0037138 | A1 | 2/2003 | Brown |
| 2004/0091113 | A1 | 5/2004 | Sanai |
| 2004/0139334 | A1 | 7/2004 | Weisman |
| 2004/0225720 | A1 * | 11/2004 | Pinkerton ..................... 709/212 |
| 2004/0243349 | A1 | 12/2004 | Greifeneder |
| 2006/0123077 | A1 * | 6/2006 | Munetsugu et al. .......... 709/203 |
| 2006/0137011 | A1 * | 6/2006 | Kim et al. ....................... 726/22 |

FOREIGN PATENT DOCUMENTS

| EP | 1564963 A | 8/2005 |
| GB | 2371125 A | 7/2002 |
| WO | 2007/111662 A2 | 10/2007 |
| WO | 2007/111662 A3 | 2/2008 |

OTHER PUBLICATIONS

International Search Report; World Intellectual Property Organization: International Publication No. WO 2007/111662 A3; International Publication Date Oct. 4, 2007.
International Search Report; World Intellectual Property Organization: International Application No. PCT/US2006/047905; International Mailing Date Dec. 14, 2007.

(Continued)

Primary Examiner — Hosuk Song
Assistant Examiner — Chi Nguy
(74) Attorney, Agent, or Firm — Joni D. Stutman

(57) ABSTRACT

A method, apparatus and system enable access control and intrusion detection on encrypted data. Specifically, application data on a node may be routed to a partition on the computing platform. The partition may utilize Direct Memory Access ("DMA") to access session key stored in system memory of a host operating system on the platform. The partition may thereafter utilize the session key to perform intrusion detection on encrypted data from the application running under the host operating system. Other embodiments may be described and claimed.

20 Claims, 5 Drawing Sheets

OTHER PUBLICATIONS

International Preliminary Report on Patentability and Written Opinion received for PCT Application No. PCT/US2006/047905, mailed on Jul. 3, 2008, 6 pages.

Office Action received for Chinese Patent Application No. 200680043325.1, mailed on Jun. 26, 2009, 11 pages of Chinese Office Action, including 5 pages of English translation.

Office Action received for Chinese Patent Application No. 200680043325.1, mailed on Jul. 30, 2010, 5 pages of Chinese Office Action, including 2 pages of English translation.

Office Action received for European Patent Application No. 06849965.6, mailed on Nov. 11, 2008, 3 pages.

* cited by examiner

US 8,024,797 B2

METHOD, APPARATUS AND SYSTEM FOR PERFORMING ACCESS CONTROL AND INTRUSION DETECTION ON ENCRYPTED DATA

BACKGROUND

Various intrusion detection systems exist today to enhance the security of data on computer platforms by detecting potential attacks on the data. One limitation of these intrusion detection systems (IDSes) is that they can typically only monitor unencrypted data and/or encrypted data where the encryption key has been provided to the intrusion detection system. Thus, for example, although IDSes are able to read network traffic before the traffic is encrypted and sent out to the intended recipient, since most applications typically perform their own encryption before sending data out to the network drivers, i.e., before it is received by the IDS, the IDSes "see" encrypted data which they are unable to examine. As a result, unless provided with a decryption key, existing IDSes are typically unable to perform intrusion detection on encrypted data even though the IDS may be co-resident on the devices that are sending or receiving the traffic.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention provide a method, apparatus and system for performing access control and intrusion detection on encrypted data. More specifically, embodiments of the present invention provide a scheme utilizing Direct Memory Access ("DMA") to enable access control and intrusion detection on encrypted data within a platform. Reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

Figure 1:
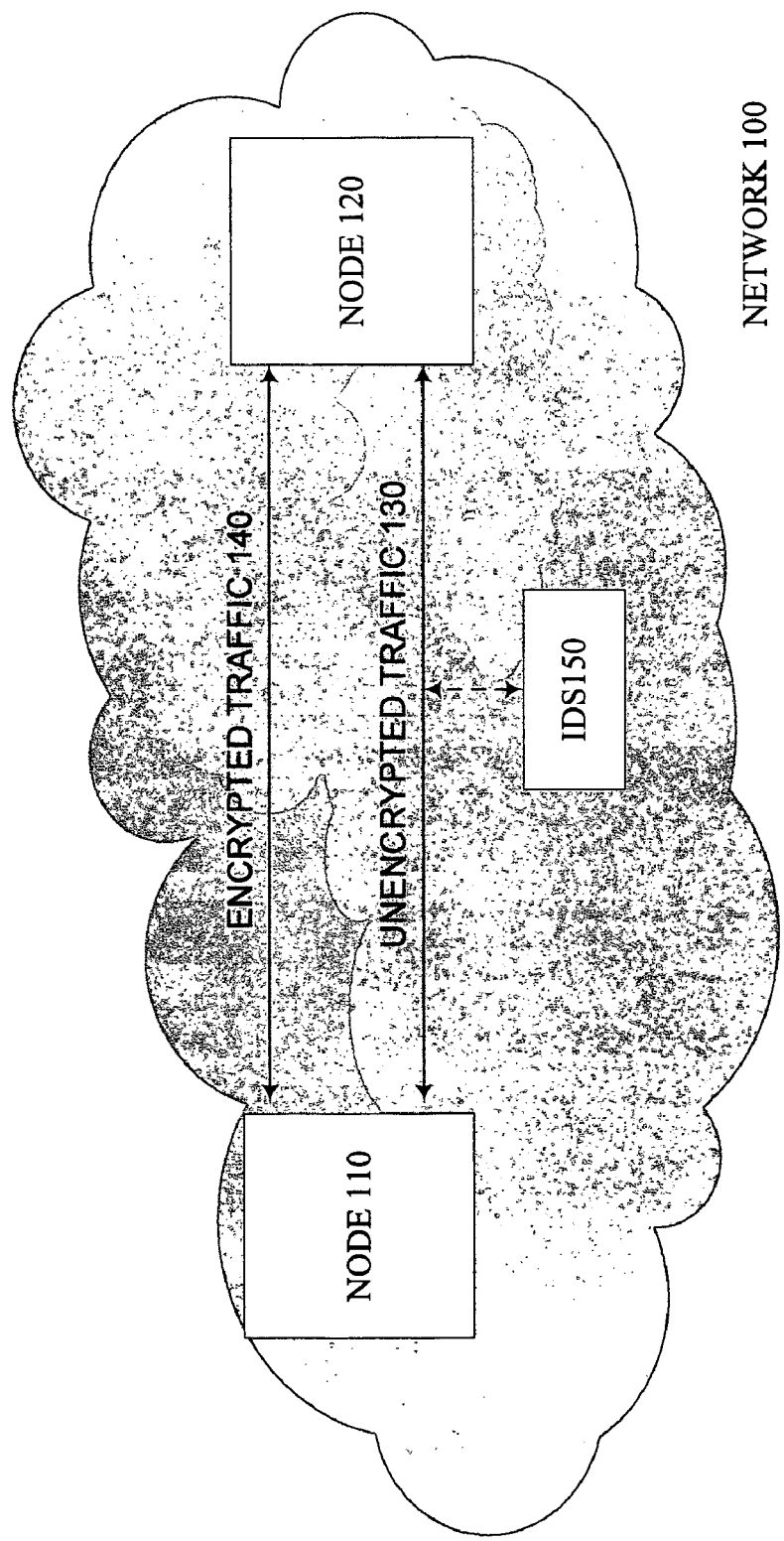
FIG. 1 illustrates a typical existing implementation of an intrusion detection system.

FIG. 1 illustrates conceptually an IDS in a typical network. As illustrated, the network ("Network 100") may include two or more nodes ("Node 110" and "Node 120") and an IDS ("IDS 150"). It will be readily apparent to those of ordinary skill in the art that although only two nodes are illustrated, additional nodes may also reside on Network 100. Additionally, it will be apparent to those of ordinary skill in the art that Network 100 may comprise multiple types of networks (local area networks, wide area networks, etc.). IDS 150 may monitor traffic between Node 110 and Node 120 (and other nodes on Network 100). As illustrated, the network traffic between nodes may comprise unencrypted traffic ("Unencrypted Network Traffic 130) and encrypted traffic ("Encrypted Network Traffic 140"). IDS 150 may be able to examine Unencrypted Network Traffic 130 to determine whether the data has been compromised, but it may not be able to perform any type of examination of Encrypted Network Traffic 140 unless the applications on Node 110 and/or Node 120 manually present IDS 150 with a decryption key to decrypt the traffic prior to examination. Thus, unless the applications on Node 110 and/or Node 120 cooperate with IDS 150, Encrypted Network Traffic 140 is typically not accessible to IDS 150.

Embodiments of the present invention enable monitoring of encrypted traffic between nodes on a network, without knowledge and/or cooperation from applications running on the nodes. Since IDSes are already able to monitor unencrypted data, the following description of embodiments of the invention focuses on intrusion detection on encrypted data. More specifically, in one embodiment, a monitoring partition may utilize DMA to access security keys on a node to perform intrusion detection on encrypted data. DMA typically enables separate components within a computer system to directly access the system's Random Access Memory ("RAM") without interacting with the operating system. The concept of DMA is well known to those of ordinary skill in the art and further description thereof is omitted herein in order not to unnecessarily obscure embodiments of the present invention.

The monitoring partition may comprise a variety of different types of partitions, including an entirely separate hardware partition (e.g., utilizing Intel® Corporation's Active Management Technologies ("AMT"), "Manageability Engine" ("ME"), Platform Resource Layer ("PRL") and/or other comparable or similar technologies) and/or a virtualized partition (e.g., a virtual machine in Intel® Corporation's Virtualization Technology ("VT") scheme). It will be apparent to those of ordinary skill in the art that a virtualized host may also be used to implement AMT, ME and PRL technologies (as described in further detail below).

Figure 2:
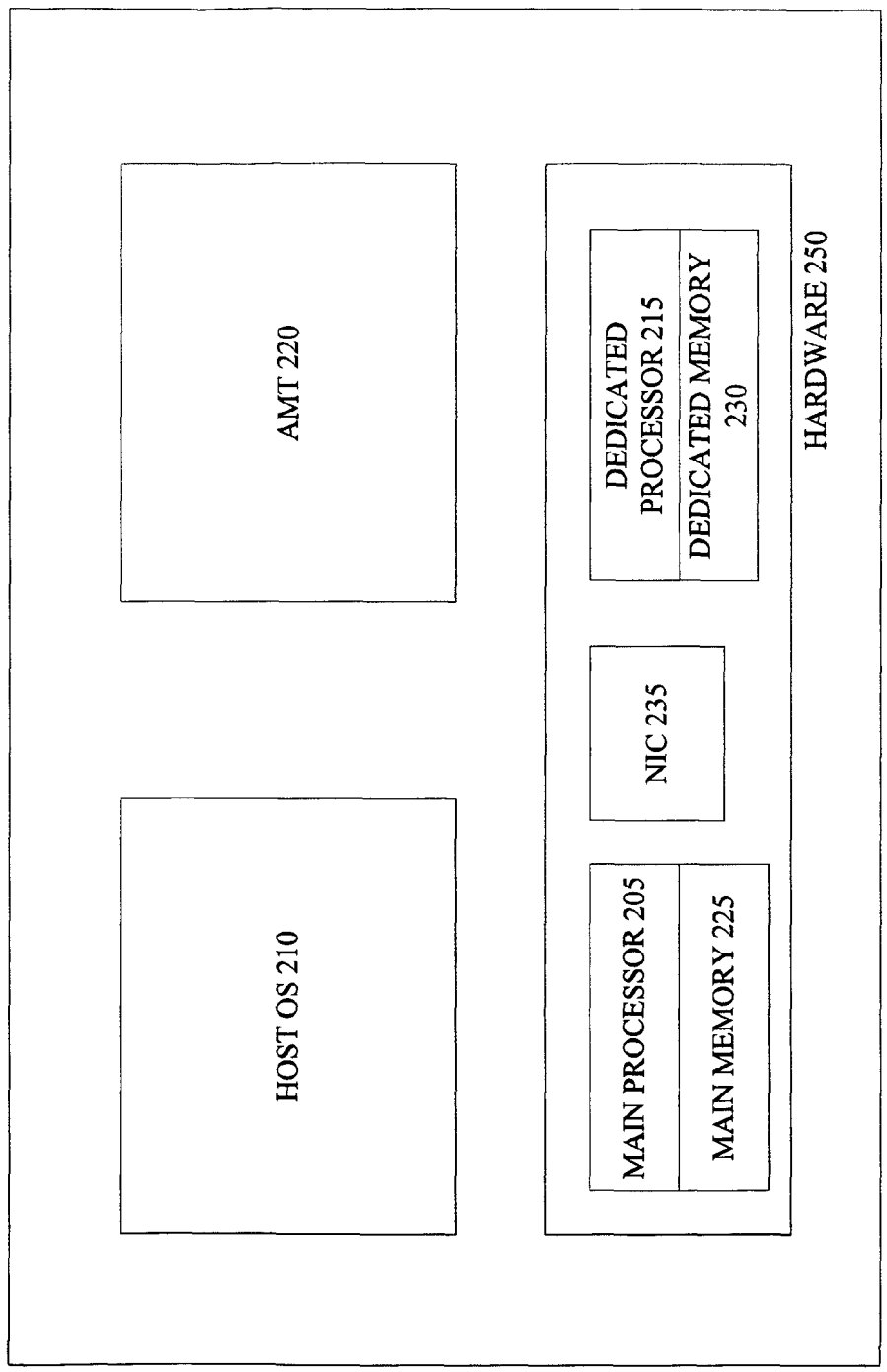
FIG. 2 illustrates an example AMT environment.

By way of example, FIG. 2 illustrates conceptually a typical AMT environment as implemented by Intel® Corporation. It will be readily apparent to those of ordinary skill in the art that embodiments of the present invention may also be implemented in other similar and/or comparable implementations of AMT. Only the components pertinent to describing the AMT environment have been illustrated in order not to unnecessarily obscure embodiments of the present invention, but it will be readily apparent to those of ordinary skill in the art that additional components may be included without departing from the spirit of embodiments of the invention.

Thus, as illustrated in FIG. 2, a node ("Node 200") may include a host operating system ("Host OS 210") and system hardware ("Hardware 250"). According to one embodiment, Hardware 250 may include two processors, one to perform typical processing tasks for Host OS 210 ("Main Processor 205") while the other may be dedicated exclusively to managing the device via a dedicated partition ("Dedicated Processor 215" for "AMT 220"). Each processor may have associated resources on Node 200 and they may share one or more other resources. Thus, as illustrated in this example, Main Processor 205 and Dedicated Processor 210 may each have portions of memory dedicated to them ("Main Memory 225" and "Dedicated Memory 230" respectively) but they may share a network interface card ("NIC 235").

Figure 3:
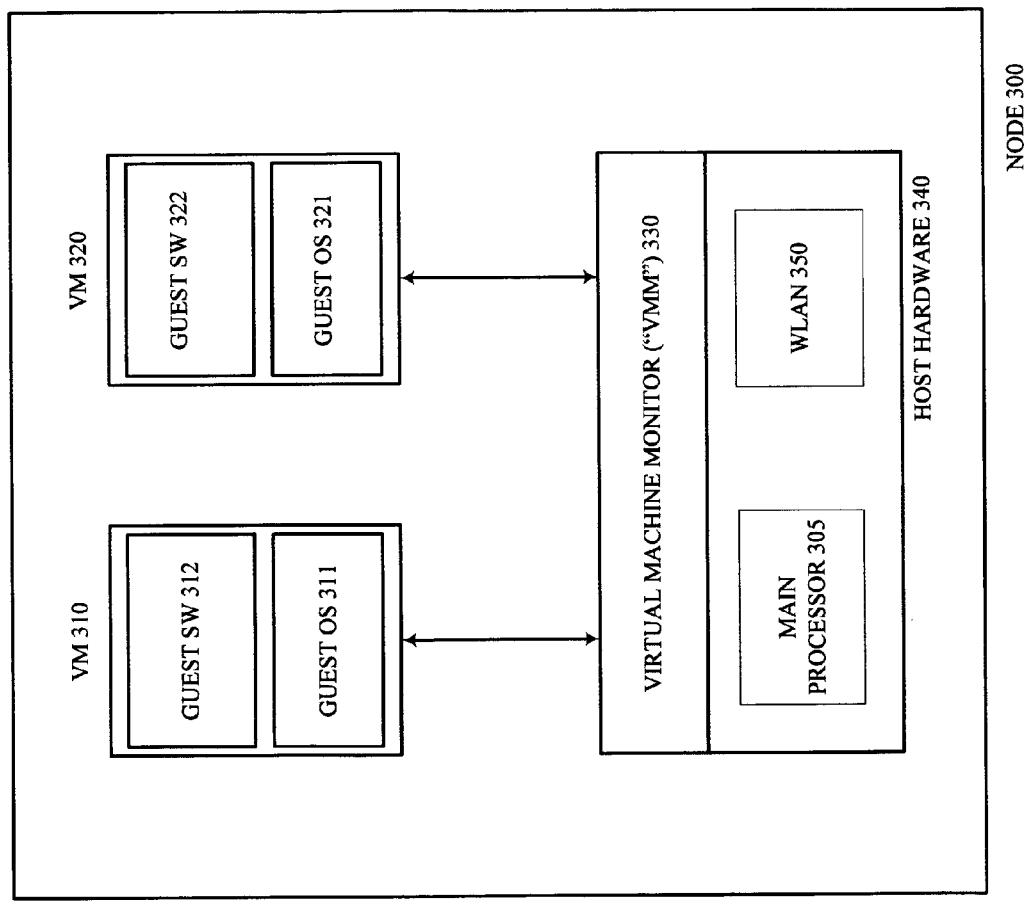
FIG. 3 illustrates an example virtual machine host.

Similarly, as illustrated in FIG. 3, if the node ("Node 300") is virtualized, it may include only a single processor but a virtual machine monitor ("VMM 330") on the device may present multiple abstractions and/or views of the device or host, such that the underlying hardware of the host appears as one or more independently operating virtual machines ("VMs"). VMM 330 may be implemented in software (e.g., as a standalone program and/or a component of a host operating system), hardware, firmware and/or any combination thereof. VMM 330 manages allocation of resources on the host and performs context switching as necessary to cycle between various VMs according to a round-robin or other predetermined scheme. It will be readily apparent to those of ordinary skill in the art that although only one processor is illustrated ("Main Processor 305"), embodiments of the present invention are not so limited and multiple processors may also be utilized within a virtualized environment.

Although only two VM partitions are illustrated ("VM 310" and "VM 320", hereafter referred to collectively as "VMs"), these VMs are merely illustrative and additional virtual machines may be added to the host. VM 310 and VM 320 may function as self-contained platforms respectively, running their own "guest operating systems" (i.e., operating systems hosted by VMM 330, illustrated as "Guest OS 311" and "Guest OS 321" and hereafter referred to collectively as "Guest OS") and other software (illustrated as "Guest Software 312" and "Guest Software 322" and hereafter referred to collectively as "Guest Software").

Each Guest OS and/or Guest Software operates as if it were running on a dedicated computer rather than a virtual machine. That is, each Guest OS and/or Guest Software may expect to control various events and have access to hardware resources on Host 100. Within each VM, the Guest OS and/or Guest Software may behave as if they were, in effect, running on Node 300's physical hardware ("Host Hardware 340", which may include a Network Interface Card ("NIC 350")).

It will be readily apparent to those of ordinary skill in the art that a physical hardware partition with a dedicated processor (as illustrated in FIG. 2, for example) may provide a higher level of security than a virtualized partition (as illustrated in FIG. 3), but embodiments of the invention may be practiced in either environment and/or a combination of these environments to provide varying levels of security. It will also be readily apparent to those of ordinary skill in the art that an AMT, ME or PRL platform may be implemented within a virtualized environment. For example, VM 320 may be dedicated as an AMT partition on a host while VM 310 runs typical applications on the host. In this scenario, the host may or may not include multiple processors. If the host does include two processors, for example, VM 320 may be assigned Dedicated Processor 215 while VM 310 (and other VMs on the host) may share the resources of Main Processor 205. On the other hand, if the host includes only a single processor, the processor may serve both the VMs, but VM 320 may still be isolated from the other VMs on the host with the cooperation of VMM 330. For the purposes of simplicity, embodiments of the invention are described in an AMT environment, but embodiments of the invention are not so limited. Instead, any reference to AMT, a "partition", a secure partition", a "security partition" and/or a "management partition" shall include any physical and/or virtual partition (as described above).

Figure 4:
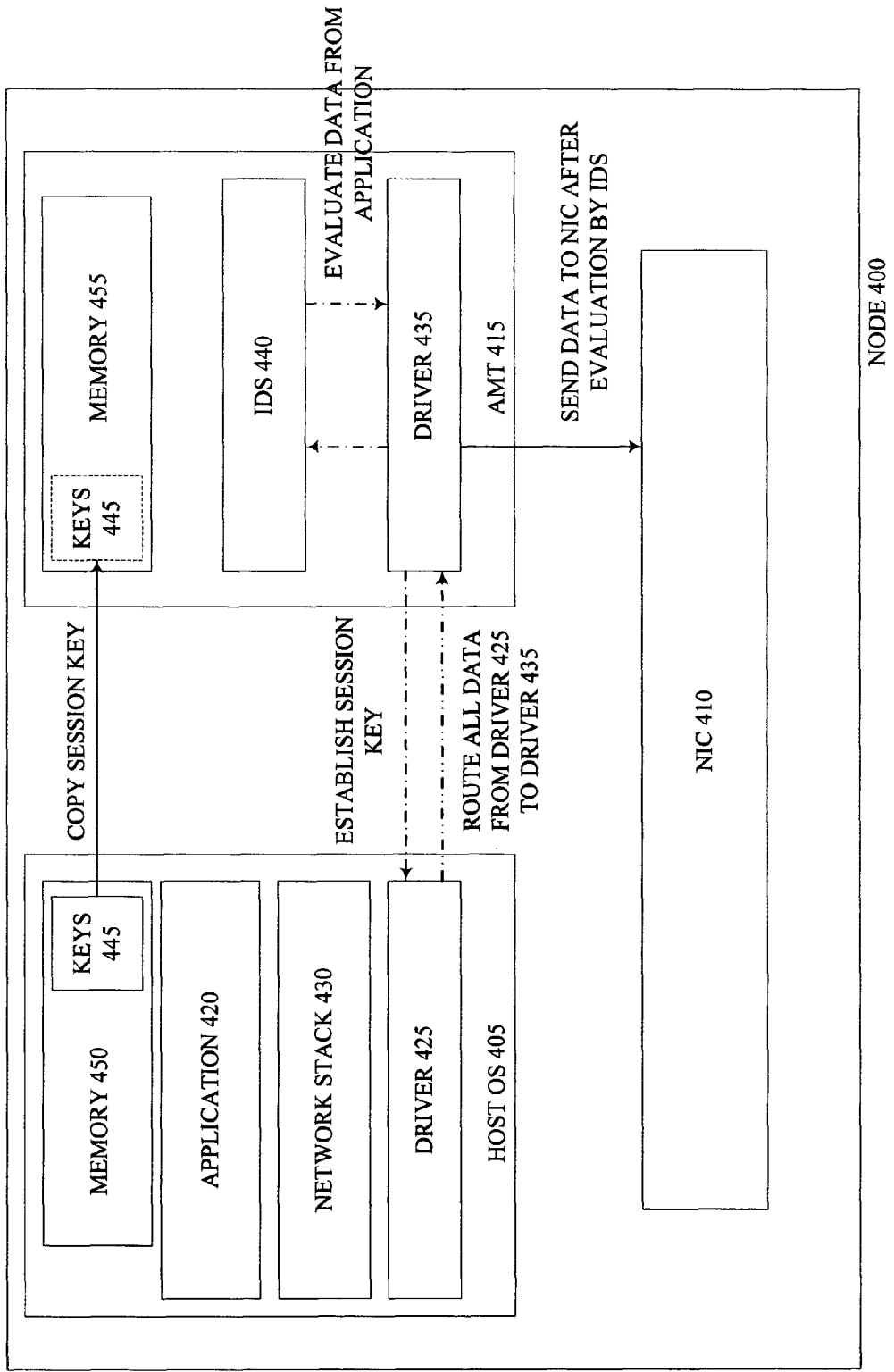
FIG. 4 illustrates conceptually the components of an embodiment of the present invention.

FIG. 4 illustrates an embodiment of the present invention. As illustrated, according to one embodiment of the present invention, a computing device ("Node 400") may include at least three logical components, namely a host partition including a host operating system ("Host OS 405"), network hardware/firmware ("NIC 410") and a dedicated partition such as an AMT ("AMT 415"). As previously stated, although the following description assumes an AMT, embodiments of the invention are not so limited.

According to embodiments of the present invention, Host OS 405 may include various applications capable of performing encryption (illustrated collectively as "Application 420"), a network driver ("Driver 425), a network stack ("Network Stack 430") and a memory ("Memory 450"). It will be readily apparent to those of ordinary skill in the art that Application 420 may comprise a variety of applications that typically perform encryption, e.g., Virtual Private Network ("VPN") applications, firewall applications, gateway applications, etc. In various embodiments, applications may also include other components such as privileged components (e.g., kernel modules). Thus, any reference herein to "applications" shall be read to include at least the above-described components. In one embodiment, AMT 415 may include a network driver ("Driver 435") and an intrusion detection system ("IDS 440").

In one embodiment, Application 420 on Host OS 405 may establish a connection to AMT 415. More specifically, Application 420, via Network Driver 425 on Host OS 504, may send a request to Driver 435 to establish an encrypted connection to a remote location. It will be readily apparent to those of ordinary skill in the art that the "remote" location may be physically remote to Node 400 (i.e., over a network) or virtually remote, e.g., from one VM to another. By establishing an encrypted connection, the two end points may securely exchange data traffic, i.e., it eliminates the possibility of other applications and/or VMs snooping the data traffic. Additionally, it will be readily apparent to those of ordinary skill in the art that this connection from one partition to the other may be a DMA-based connection, a connection facilitated by a VMM, basic input-output system ("BIOS") and/or a specialized physical or logical channel between the partitions. In one embodiment, Application 420 may not generate a request. Instead, Application 420 may simply be checked for execution via a "presence check", as described for example, in co-pending application entitled "Systems, Apparatuses, and Methods for A Host Software Presence Check From An Isolated Partition", Ser. No. 11/174,315, files on Jun. 30, 2005, assigned to the assignee of the present application. The presence check may in addition automatically establish a connection from one partition to the other. For the purposes of simplicity, however, the following examples shall assume the latter embodiment, i.e., one in which Application 420 sends a request for a connection.

The request from Application 420 may include information such as which port is being requested, the source and destination address for data traffic, etc. Driver 425 may make note of all the information from Application 420 and routes the request to Driver 435 on AMT 415. Enabling Driver 425 to route traffic to Driver 435 instead of to NIC 410 is a well-known feature of AMT platforms and further description thereof is omitted herein in order not to unnecessarily obscure embodiments of the present invention.

Driver 435 in AMT 415 may transmit the request to the appropriate remote location, receive a response from the remote location and transmit the response back to Driver 425 on Host OS 405. Utilizing information in the response, Application 420 may then generate a symmetric session key. The process of generating symmetric keys is well known to those of ordinary skill in the art and further description thereof is omitted herein in order not to unnecessarily obscure embodiments of the present invention. In one embodiment, the symmetric session key ("Key 445") may be stored in Host OS 405's memory ("Memory 450") but it may not be copied into Host OS 405's swap space, i.e., the virtual memory on Host OS 405.

Once the encrypted connection has been established, Application 420 may generate and transmit traffic which may be routed from Host OS 405 to AMT 415. As previously described, in one embodiment of the present invention, Driver 425 on Host OS 405 may be enhanced to route the traffic to Driver 435 on AMT 415. In one embodiment, AMT 415 may identify the traffic as encrypted data using a one or more well-known heuristics. Descriptions of these heuristics are omitted herein in order not to unnecessarily obscure embodiments of the present invention. Upon identifying encrypted traffic, AMT 415 may examine the information received from Driver 425 during the initialization process (i.e., when the connection was initially established). From this information, AMT 415 may determine which application is sending the data and other information pertaining to the network connection such as the location of Application 420 within Memory 450. AMT 415 may then utilize DMA to identify the location of Application 420 within Memory 450 and search the memory location to find Key 445.

In one embodiment, AMT 415 may flag the memory address of Key 445 in Host 405's memory to be monitored. AMT 415 may additionally copy Key 445 into AMT 415's memory ("Memory 455"). Thereafter, Driver 435 may utilize Key 445 to unencrypt encrypted data traffic originating from Application 420 as necessary and IDS 440 in AMT 415 may examine all the data. As is typical, Application 420 may change Key 445 after a predetermined period or a predetermined amount of traffic has been generated. If the new key replaces the old key in the same memory location in Memory 450, in one embodiment, AMT 415 may be informed of the change (since it is monitoring the memory location of Key 445 in Memory 450).

In an alternate embodiment, if the new key is stored in a new location in Memory 450, then AMT 415 may not be aware of the change until it realizes that Key 445 no longer works to decrypt the encrypted traffic originating from Application 420. At that point, AMT 415 may repeat the process described above, i.e., identify the location of Host OS 405's memory allocated to Application 420 and search that memory location to find the new key. When Application 420 stops generating traffic, i.e., when Application 420 releases the memory allocated to it in Memory 450, AMT 415 may determine that Key 445 is no longer useful or necessary and erase Key 445 from Memory 455.

Figure 5:
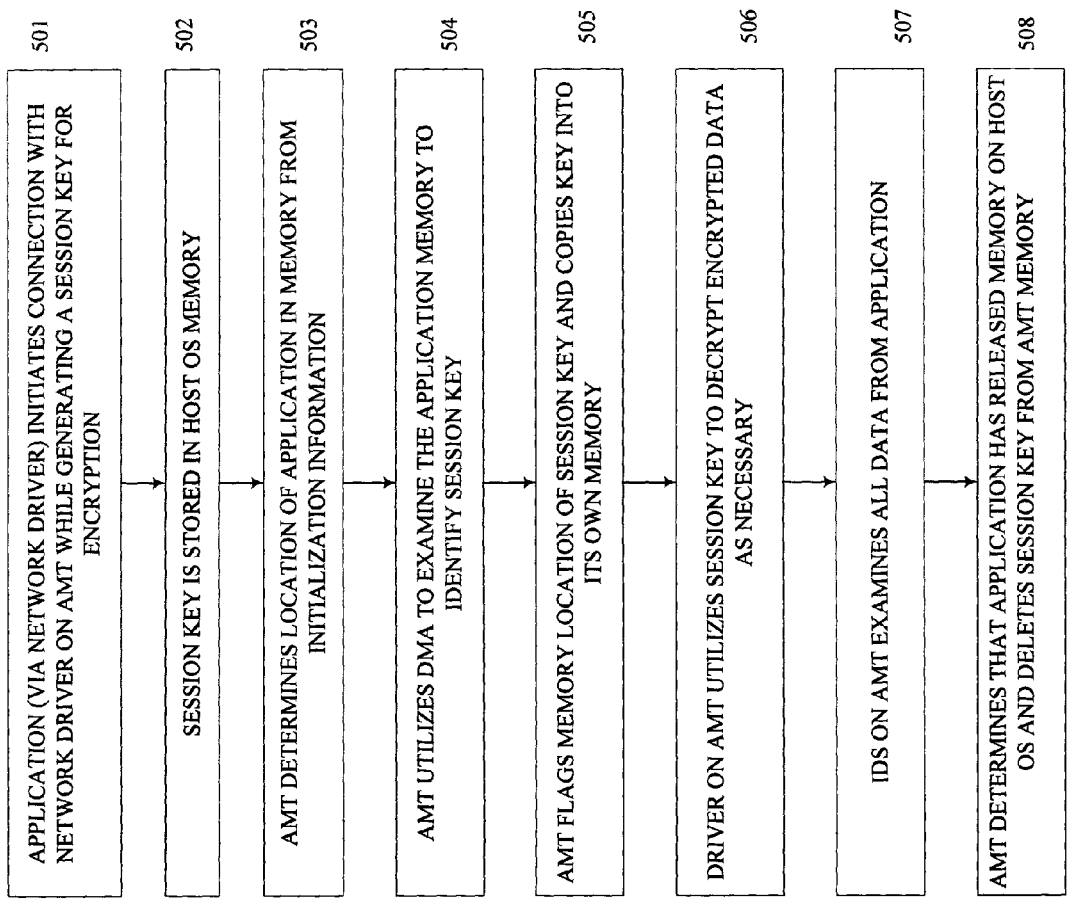
FIG. 5 is a flow chart illustrating an embodiment of the present invention.

FIG. 5 is a flow chart illustrating an embodiment of the present invention. Although the following operations may be described as a sequential process, many of the operations may in fact be performed in parallel and/or concurrently. In addition, the order of the operations may be re-arranged without departing from the spirit of embodiments of the invention. In 501, an application on a node, via a network driver on a host OS, may initiate a connection with a network driver on an AMT on the node by generating a session key to encrypt all data generated by the application. The session key may then be stored in the host OS memory in 502. In 503, the AMT may determine which portion of the host OS memory is allocated to the application based on the initialization information (provided to the network driver on AMT when the connection is initially established). Thereafter, in 504, the AMT may utilize DMA to examine the allocated memory to find the session key. The AMT may then in 505 flag the memory location where the session key is stored to be monitored, and copies the key into its own memory. In 506, the network driver in the AMT utilizes the session key to decrypt data traffic originating from Application 420 as necessary and in 507, an IDS in the AMT may examine all data originating from the application on the host OS. In 508, AMT determines that application has released the memory on the host OS and erases key from AMT memory.

Embodiments of the present invention may be implemented on a variety of computing devices. According to an embodiment, a computing device may include various other well-known components such as one or more processors. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. One or more of these elements may be integrated together with the processor on a single package or using multiple packages or dies. A host bus controller such as a Universal Serial Bus ("USB") host controller may be coupled to the bus(es) and a plurality of devices may be coupled to the USB. For example, user input devices such as a keyboard and mouse may be included in the computing device for providing input data. In alternate embodiments, the host bus controller may be compatible with various other interconnect standards including PCI, PCI Express, FireWire and other such existing and future standards.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of controlling performance of intrusion detection on encrypted data to be sent by a computing platform over a network comprising:
   identifying, by a monitoring partition running on the computing platform, a memory location of an application in a memory of a host operating system ("OS"), the host OS residing in a host partition running on the computing platform;
   identifying a session key stored in the memory location of the application utilizing Direct Memory Access ("DMA"), the session key corresponding to encrypted data from the application;
   copying the session key into a memory in the monitoring partition;
   utilizing the session key in the monitoring partition to decrypt the encrypted data received by an intrusion detection system within the monitoring partition from the application in the host partition; and
   examining decrypted data by the intrusion detection system within the monitoring partition to perform intrusion detection for the computing platform.

2. The method according to claim 1 further comprising one of:
   preventing transmission of the encrypted data from the application if the encrypted data is determined to be compromised as a result of performing intrusion detection; and
   sending the encrypted data to a network interface card ("NIC") to be transmitted from the computing platform over the network if the encrypted data is uncompromised.

3. The method according to claim 1 further comprising establishing a local connection between the monitoring partition and the host partition on the computing platform, responsive to a request by the application to establish an encrypted connection from the host partition of the computing platform to a remote location.

4. The method according to claim 3 wherein establishing the local connection further comprises:
- sending a request for a local connection from the host partition to the monitoring partition, the request including information pertaining to the local connection;
- storing the information pertaining to the local connection;
- generating the session key in the host partition; and
- making available to the monitoring partition the encrypted data corresponding to the session key.

5. The method according to claim 4 wherein sending the request for the local connection further comprises automatically establishing the local connection from the host partition to the monitoring partition.

6. The method of claim 1, wherein the monitoring partition comprises a Manageability Engine partition running on a Manageability Engine processor.

7. The method of claim 1, wherein the host partition and the monitoring partition comprise virtual machines in a virtualization system.

8. A computing platform, comprising:
- a processor to run a host partition;
- a memory,
- wherein the host partition running a host operating system and an application, the application configured to run in a portion of the memory of the host operating system, the application further configured to generate a session key stored in the portion of the memory running for the application, the application further configured to utilize the session key to generate encrypted data to be sent over a network coupled to the computing platform, the session key corresponding to the encrypted data; and
- a monitoring partition running an intrusion detection system and configured to receive the encrypted data from the application in the host partition, the monitoring partition further configured to utilize direct memory access ("DMA") to locate and copy the session key from the portion of the memory for the application, the monitoring partition additionally configured to utilize the session key copied from the portion of the memory running the application to decrypt the encrypted data, the intrusion detection system of the monitoring partition to perform intrusion detection on the decrypted data prior to sending the encrypted data over the network.

9. The computing platform according to claim 8 further comprising:
- a network interface card ("NIC") configured to establish a local connection between the host partition and the monitoring partition on the computing platform, responsive to a request by the application to establish an encrypted connection to another computing platform over the network.

10. The computing platform according to claim 9 wherein the NIC is further configured to route a request for the local connection from the host partition to the monitoring partition.

11. The computing platform according to claim 10 wherein routing the request for the local connection from the host partition to the monitoring partition further comprises:
- the host partition configured to send the request for a connection via the NIC to the monitoring partition, the request including information pertaining to the connection, the host partition further configured to store the information pertaining to the connection, and the host partition additionally configured to make available to the monitoring partition the encrypted data corresponding to the session key generated by the application.

12. The computing platform according to claim 9 wherein the monitoring partition is additionally configured to perform one of:
- preventing transmission of the encrypted data from the application if the encrypted data is determined to be compromised as a result of performing intrusion detection; and
- sending the encrypted data to a network interface card ("NIC") to be transmitted from the computing platform over the network if the encrypted data is uncompromised.

13. The computing platform according to claim 8 further comprising:
- a main processor to run the host partition; and
- a dedicated processor dedicated to run the monitoring partition.

14. The computing platform of claim 8, wherein the monitoring partition comprises an Active Management Technologies (AMT) partition running on an AMT processor.

15. The computing platform of claim 8, wherein the monitoring partition comprises a Manageability Engine partition running on a Manageability Engine processor.

16. The computing platform of claim 8, wherein the host partition and the monitoring partition comprise virtual machines in a virtualization system running on the computing platform.

17. An article comprising a non-transitory machine-accessible medium having stored thereon instructions that, when executed by a computing platform, cause the computing platform to:
- control performance of intrusion detection on encrypted data to be sent by the computing platform over a network by
- identifying, by a monitoring partition running on the computing platform, a memory location of an application in a memory of a host operating system ("OS"), the host OS residing in a host partition running on the computing platform;
- identifying a session key stored in the memory location of the application utilizing Direct Memory Access ("DMA"), the session key corresponding to encrypted data from the application;
- copying the session key into a memory in the monitoring partition;
- utilizing the session key in the monitoring partition to decrypt the encrypted data received by the monitoring partition from the application in the host partition; and
- examining decrypted data by an intrusion detection system within the monitoring partition to perform intrusion detection for the computing platform.

18. The article according to claim 17 wherein the instructions, when executed by the computing platform, further cause the computing platform to:
- prevent transmission of the encrypted data from the application if the encrypted data is determined to be compromised as a result of performing intrusion detection; and
- send the encrypted data to a network interface card ("NIC") to be transmitted from the computing platform over the network if the encrypted data is uncompromised.

19. The article according to claim 17 wherein the instructions, when executed by the computing platform, further cause the computing platform to establish a local connection between the monitoring partition and the host partition on the computing platform, responsive to a request by the application to establish an encrypted connection from the host partition of the computing platform to a remote location.

20. The article according to claim 19 wherein the instructions, when executed by the computing platform further cause the computing platform to establish the local connection by:
  sending a request for a local connection from the host partition to the monitoring partition, the request including information pertaining to the local connection;
  storing the information pertaining to the local connection;
  generating the session key in the second host partition; and
  making available to the monitoring partition the encrypted data corresponding to the session key.

\* \* \* \* \*